Patented Feb. 1, 1949

2,460,284

UNITED STATES PATENT OFFICE 2,460,284

TOBACCO COMPOSITION AND METHOD OF MAKING IT

William J. Hale, Midland, Mich., assignor to The National Agrol Company, Inc., Washington, D. C., a corporation of Delaware No Drawing. Application August 1, 1944,
Serial No. 547,627

6 Claims. (Cl. 131—17)

This invention relates to a process of and product for improving combustion of organic substances in the presence of air or other oxygen carriers, more specifically it relates to a catalyst to be employed to this end.

In the plant world the catalyst chlorophyll functions both as a carrier for oxygen and as a synthesizing agent; these two functions dovetail together in the transformation of absorbed carbonic acid into carbohydrates. The capacity of chlorophyll to take up oxygen in passing from chlorophyll-a into chlorophyll-b is balanced in nature against an equal capacity on the part of the accompanying carotenes to take up the same oxygen to yield xanthophylls which, in turn, through the agency of enzymes, are reconverted into acceptor carotenes to reenter the cycle.

The practically universal presence of carotenes in natural flora along with the chlorophyll, which occurs everywhere excepting in fungi, is indicative of the close interfunctional relationship here involved. Indeed, Aronoff and Mackinney (J. Am. Chem. Soc. 65, 956 (1943)) emphasize the protective effect displayed by carotenes 'n guarding against the destruction of chlorophyll by photo-oxidation. The color of the autumn foliage of deciduous trees is known to be due to the ever present carotenoid colors following decomposition of the blue-green chlorophyll under increased dryness and the prolonged action of heat and sunlight.

So marked is the avidity of chlorophyll for oxygen that many organic compounds are totally destroyed in the presence of this catalyst. Furthermore, under certain conditions, simple compounds, such as carbonic acid, may be reduced thereby to formaldehyde by mere contact with an activated chlorophyll. This latter action has been set forth in U. S. Patent to Paschal No. 2,326,672, of August 10, 1943, in which the air of a closed room is refreshed by the mere presence of activated chlorophyll.

The term chlorophyll, as herein employed, comprehends a class of compounds comprising a structure of four pyrrole rings and four methine groups linked alternately into a 16-membered ring known as porphin. Derivatives of porphins, the porphyrins, include a wide range of compounds encompassing both hemin and chlorophyll; the former contains within its molecule a centrally functioning iron atom, whereas the latter presents a magnesium atom in same relative position.

Chlorophyll itself is insoluble in water and thus is difficult to extend in extreme dispersement over extended surface. Under mild hydrolysis, however, chlorophyll may be deprived of both its phytyl and methyl groups to yield an alkali, or other metal, soluble salt which is known as chlorophyllin. This latter reacts even as avidly as the insoluble chlorophyll in both oxidative and catalytic direction; and in this context the use of the term chlorophyllin immediately signi-chlorophyllins (a and b) or specifically solubilized forms of chlorophyll.

In recent years the therapeutic action of chlorophyll has assumed greater and greater significance. Particularly the checking and elimination of local infections is credited to the use of water-soluble chlorophyll. At all times, however, the oxygen supply is a prerequisite to such healing.

The observation that certain dried sea weeds of less chlorophyll content oxidized more difficultly than dried land plants of greater chlorophyll content, taken together with the comparative indifference to fire of dried leaves that have lost much of their chlorophyll through partial mulching and decomposition, indicates clearly that chlorophyll might well constitute the outstanding catalyst to simple combustion. No better example need be cited than that of the oxidation of tobacco. Careful aeration of tobacco leaves, during the curing process without too much heat or sunlight, is known to yield a better and more even oxidation tobacco, than a tobacco dried in intense sunlight.

Though considerable chlorophyll, as such, may be found to reside in all samples of smoking tobacco it is far reduced below its original approach to one percent content within the green leaf. The present invention comprehends the concept of the addition of solubilized chlorophyll to cured tobacco to enhance the smoking qualities of said tobacco. It is now discovered that the addition of only a small fraction of one percent of solubilized chlorophyll, such as water-soluble solubilized chlorophyll, to a hundred-weight of the tobacco preferably in its final step of preparation for the market, either as a pipe tobacco, a cigarette tobacco or even as a chewing tobacco, will markedly enhance its smoking and oxidation qualities.

Particularly is it to be noted that in the presence of an additional small quantity of chlorophyll, or its derivatives, preferably when applied to the outer surface of tobacco granules as by spraying with a water-soluble chlorophyll solution, insures a marked oxidation reaction during the smoking of said prepared tobacco. Whereas, under ordinary conditions, the smoking of tobacco is accompanied by the distillation therefrom toward the smoker's mouth of appreciable quantities of amino acids of strong and disagreeable taste and odor, there is now to be observed a considerable reduction in amount of said unpleasant decomposition products and primarily by reason of the highly increased oxidative influences set up by the catalyst chlorophyll or porphyrins in general.

Though the use of a highly comminuted dust of solubilized chlorophyll applied directly to the tobacco will admirably serve the purpose of this invention and thereby contribute to increased oxidative reactions, it is preferred to apply said chlorophyll in water, alcoholic or other organic solvent solution thus insuring a deeper uniform penetration of each tobacco granule by the thinnest possible layer of molecular chlorophyll. Thus, as the flame of the burning tobacco advances the next adjoining particles of tobacco are deluged with an increased supply of nascent oxygen emanating directly from a heat induced higher oxidized form of chlorophyll just prior to its own decomposition into nitrogen, carbon dioxide and water. The result is therefore the desired oxidation of chlorophyllized tobacco over against ordinary or almost de-chlorophyllized tobacco.

The amino acids constitute the most unpleasant and undesirable vaporous material issuing from dry distillation of tobacco, as displayed in smoking of same. These amino acids, of high boiling points, are the object of first attack by the oxygen liberated in the oxidation reactions of the chlorophyll and hence the addition of chlorophyll tends to eliminate the unpleasant taste due to such acids. Though a somewhat more liberal application of chlorophyll may appear desirable at times, rarely, however, need the percentage amount of chlorophyll overstep two to three percent of total cured tobacco. At this latter concentration chlorophyll is found to favor complete combustion of almost all known organic compounds, particularly of carbohydrates, proteins and alkaloids, embracive of alcohols, acids and esters in general, and even to some extent of hydrocarbons. Especial care, therefore, is required in the proper blending of chlorophyllized tobacco lest the tendency to fuller combustion contributes to total destruction of the highly volatile alkaloids for which the smoker is striving.

Any proportion of chlorophyll beyond approximately one-tenth of one percent, or that serving simply as catalyst, may be considered as entering into molecular combination with nicotine, amino acids and such, as usually occur in tobacco to the extent of approximately 1 to 5 percent. The marked tendency of porphyrins in general to enter into molecular combination with a wide range of salts, bases and acids is well known. Indeed, it has been established that chlorophyll and the phyllins unite readily with pyridine, piperidine and such to yield crystallin molecular compounds.

In the same manner, $\alpha$-($\beta$-pyridyl-)-N-methyl-pyrrolidine (nicotine) and its demethylated form (nornicotine); the $\alpha$-N-methyl pyrrole derivative of $\beta$-pyridine (nicotyrine); the $\alpha$-piperidyl derivatives of $\beta$-pyridine (anabasine and its N-methyl derivative); the $\alpha$-tetrahydropyridyl derivatives of $\beta$-pyridine (anatabine and its N-methyl derivative); as well also as $\alpha,\beta$-dipyridyl, all present in tobacco, are equally capable of entering into molecular addition products with metal complex salts such as chlorophyll.

As reported by K. Weber (Ber. 69, 1026 (1936)) chlorophyll constitutes an excellent sensitizer for photo-oxidation. Furthermore, H. Gaffron (Ber. 60, 2229 (1927)) proves that the action of light on chlorophyll in presence of air and an acceptor, such as amines and the like, actually leads to formation of peroxides of these acceptors, all of which, in the case of pyridine complexes, would afford further assurance of their complete oxidation under heat.

Though the action of light on free nicotine in solution in the presence of chlorophyll, as sensitizer, has been shown to lead to marked degradation of the nicotine (Plotnikow and Weber, Chemiker Zeitung 55, 237 (1931)), the action of light on nicotines contained in tobacco and in presence of chlorophyll was found practically negligible; this possibly by reason of induced formation of nicotines direct from the constituent parts of chlorophyll as pointed out by Emde (Naturwissenschafften 17, 699 (1929)).

Thus in the burning of tobacco, light and heat must play their respective parts. The molecular compounds composed of chlorophyll and nicotine, and nicotine-like material, are decomposable at higher temperatures. For a brief span, therefore, these molecular compounds will serve to retain longer the higher boiling nicotinic complexes and, by reason of the induced peroxide formation, contribute more specifically to complete combustion of molecular complex compounds. Only the lightest boiling fractions can thereby escape into issuing vapors; these are indicated by the boiling points of nicotine and nornicotine at 245–7° C.; whereas the other nicotinic products above mentioned boil from 260 to 290° C. This same general chlorophyll catalyzed oxidative reaction applies likewise to other ingredients of tobacco. For example, the phenolic-type compounds, usually present in fire-cured tobaccos from $\frac{1}{10}$ to 1% content, unless fermented when the content drops to approximately $\frac{2}{100}$ of 1%, are found to be most easily oxidized; such selective oxidation destroying the less volatile ingredients.

The presence here of the carotenoids, which always accompany chlorophyll in nature, similarly serves a good purpose. It is not required, therefore, that these carotenoids be removed from the green extract taken directly from nature's flora. In fact, that particular class of compounds known as xanthophylls, or oxygenated carotenes, also supplies nascent oxygen in their own decomposition.

Though the term "chlorophyll-carotenoid complex" heretofore has been employed to designate this particular mixture of components, it would seem appropriate now to coin a simpler term, Verdurin, denoting the green of the leaf, to describe the sum total of all active organic individuals withdrawn from verdure or green leaves by organic solvents. This new term may be looked upon as comprehending the chlorophylls and all naturally occurring porphyrins, as well as the carotenes and their oxygenated derivatives known as xanthins, together with waxes and other products.

It will be appreciated that, if desired, other material such as hygroscopic substances may be incorporated in the tobacco to enhance its elasticity and softness. Water-soluble or hydrophylic substances serving this purpose, such for example, as pectin or gelatin and the like, may, if desired, be incorporated in a water-soluble chlorophyll so as to coat the tobacco simultaneously with the several beneficial substances.

This invention, therefore, presents a simple means of effecting a fuller oxidation notably of the less volatile distillates issuing from burning tobacco or other plant products ordinarily serving the purpose of supplying an intake of highly volatile alkaloid vapors. Opium and cubebs and the like fall into this class. While preferred modifications of the invention have been described it is to be understood that these are given to illustrate the underlying principles of the invention and not as limiting the useful scope of the invention to the particular illustrative embodiments.

I claim:

1. An article of manufacture comprising cured tobacco having therein a uniform dispersion of solubilized chlorophyll in the proportion of not more than substantially 3% on the dry weight of the tobacco.

2. An article of manufacture comprising cured tobacco having therein a uniform dispersion of solubilized chlorophyll-carotenoids in the proportion of not more than substantially 3% on the dry weight of the tobacco.

3. An article of manufacture comprising cured tobacco having therein a uniform dispersion of solubilized chlorophyll in the proportion of between .01% and 3% on the dry weight of the tobacco.

4. A method of producing a tobacco article which comprises uniformly incorporating in cured tobacco a dispersion of solubilized chlorophyll in the proportion of not more than substantially 3% on the dry weight of the tobacco.

5. A method of producing a tobacco article which comprises uniformly incorporating in cured tobacco a dispersion of solubilized chlorophyll in the proportion of between .01% and 3% on the dry weight of the tobacco.

6. A method of producing a tobacco article which comprises uniformly incorporating in cured tobacco a dispersion of solubilized chlorophyll-carotenoids complex in the proportion of not more than substantially 3% on the dry weight of the tobacco.

WILLIAM J. HALE.

REFERENCES CITED

The following references are of record in the file of this patent:

UNITED STATES PATENTS

| Number | Name | Date |
|---|---|---|
| 1,871,151 | Brown | Aug. 9, 1932 |
| 2,029,494 | Loewenthal | Feb. 4, 1936 |
| 2,031,991 | Ungnade et al. | Feb. 25, 1936 |
| 2,098,110 | Schertz et al. | Nov. 2, 1937 |
| 2,131,394 | Test | Sept. 27, 1938 |

FOREIGN PATENTS

| Number | Country | Date |
|---|---|---|
| 518,958 | Great Britain | Mar. 12, 1940 |
| 514,605 | Great Britain | 1939 |
| 6,662 | Great Britain | 1914 |
| 1,626 | Great Britain | 1901 |
| 224,324 | Germany | July 14, 1910 |
| 215,370 | Germany | Oct. 25, 1909 |